United States Patent [19]

Lybolt

[11] Patent Number: 4,477,113

[45] Date of Patent: Oct. 16, 1984

[54] WOOD HANDLING TOOL

[76] Inventor: Arden F. Lybolt, Rte. 2, Tunkhannock, Pa. 18657

[21] Appl. No.: 504,372

[22] Filed: Jun. 14, 1983

[51] Int. Cl.³ .............................................. B65G 7/12
[52] U.S. Cl. ........................................ 294/16; 294/26; 294/104
[58] Field of Search ................... 294/9, 11, 13, 15–17, 294/26, 62, 66 R, 103 R, 104, 106, 118, 164, 167, 169, 170

[56] References Cited

U.S. PATENT DOCUMENTS

| 883,820 | 4/1908 | Menere | 294/17 |
| 1,191,660 | 7/1916 | Butler | 294/16 |
| 1,365,196 | 1/1921 | Richardson | 294/106 |
| 1,519,160 | 12/1924 | Nedrow | 294/16 |
| 1,781,077 | 11/1930 | Petersen | 294/26 |
| 2,435,549 | 2/1948 | Sumter | 294/170 X |
| 2,706,131 | 4/1955 | Matz | 294/16 |
| 2,969,151 | 1/1961 | Krstulovich | 294/16 X |

FOREIGN PATENT DOCUMENTS

| 52243 | 12/1917 | Sweden | 294/16 |
| 162168 | 2/1958 | Sweden | 294/16 |

Primary Examiner—Johnny D. Cherry
Attorney, Agent, or Firm—Edmund M. Jaskiewicz

[57] ABSTRACT

A tool for lifting and carrying a piece of wood such as a log includes a rigid rod one end of which is curved downwardly with pointed elements thereon and the other end of the rod is curved upwardly to define a handle. A gripping member is loosely suspended from a central portion of the rod and is provided with a pair of diverging legs the ends of which are each provided with a point. The pointed ends on the rod and the gripping member readily penetrate into a piece of wood thereby exerting a gripping action on a piece of wood positioned between the pointed teeth on the end of the rod and the teeth on the gripping member when a lifting force is exerted upon the handle.

7 Claims, 6 Drawing Figures

WOOD HANDLING TOOL

The present invention relates to a tool for handling a piece of wood such as a log, more particularly, to such a tool for gripping a piece of wood between pointed ends of a gripping member and pointed ends on a fixed element from which the gripping member is suspended.

Many forms of handling tools have been devised in order to assist a person in lifting and carrying a piece of wood, such as a log or the like. A usual wood handling tool involves a grapple mechanism in which jaws or clamps are manipulated to engage a piece of wood and then manipulated again to release the piece of wood. Most such handling tools are rather complicated in structure and operation since they are invariably intended for large scale operation or for handling logs which are considerably greater than the size which could be used by an individual in a stove or fireplace. In addition, such wood handling tools are of considerable weight so as to be inconvenient for an individual to use when he desires to handle single logs of fireplace size. At the same time, many of the gripping or clamping elements employed in such wood handling tools are not particularly effective in gripping the wood or are of such a construction that they grip the wood to such a severe extent as to unduly damage or otherwise mar the wood.

It is therefore the principal object of the present invention to provide a novel and improved device for handling a piece of wood such as a log or the like.

It is another object of the present invention to provide a wood handling tool which is simple in construction, reliable in operation and can be easily manipulated by an individual to grip and release a piece of wood.

It is a further object of the present invention to provide such a wood handling tool which can be modified so as to be used by two persons to lift a larger size piece of wood.

It is an additional object of the present invention to provide a wood handling tool consisting of two elements which can be disassembled from each other to facilitate carrying or storage of the tool.

According to one aspect of the present invention, a device for handling a piece of wood may comprise a rigid rod having a substantially straight portion at one end of which is an upwardly curved rod end portion to define a handle and at the other end of which is an end portion curving downwardly. Pointed elements are provided at the downwardly curved end of the rod. A gripping member is loosely suspended from the central portion of the rigid rod and has a pair of diverging legs on the ends of which are sharp points directed substantially toward the points on the downwardly curved rod end. These pointed ends are sufficiently sharp to penetrate into a piece of wood and thereby exert a gripping action on a piece of wood positioned between the points on the ends of the rod and the points on the ends of the gripping member when a lifting force is exerted upon the handle.

The handle end of the rod can either be curved upwardly into an arcuate curve or curved back upon the rod. As a further modification a supporting bar can be suspended beneath the handle curved back upon the rod such that two persons may grip the ends of the supporting rod and thus carry a heavy piece of wood by means of the handling tool.

While the handling tool is intended for manual use by an individual, the tool can also be adapted so as to be suspended from a suitable lifting device as a crane or the like.

Other objects and advantages of the present invention will be apparent upon reference to the accompanying description when taken in conjunction with the following drawings, which are examples, wherein.

Proceeding next to the drawings wherein like reference symbols indicate the same parts throughout the various views a specific embodiment and modifications of the present invention will be described in detail.

Figure 1:
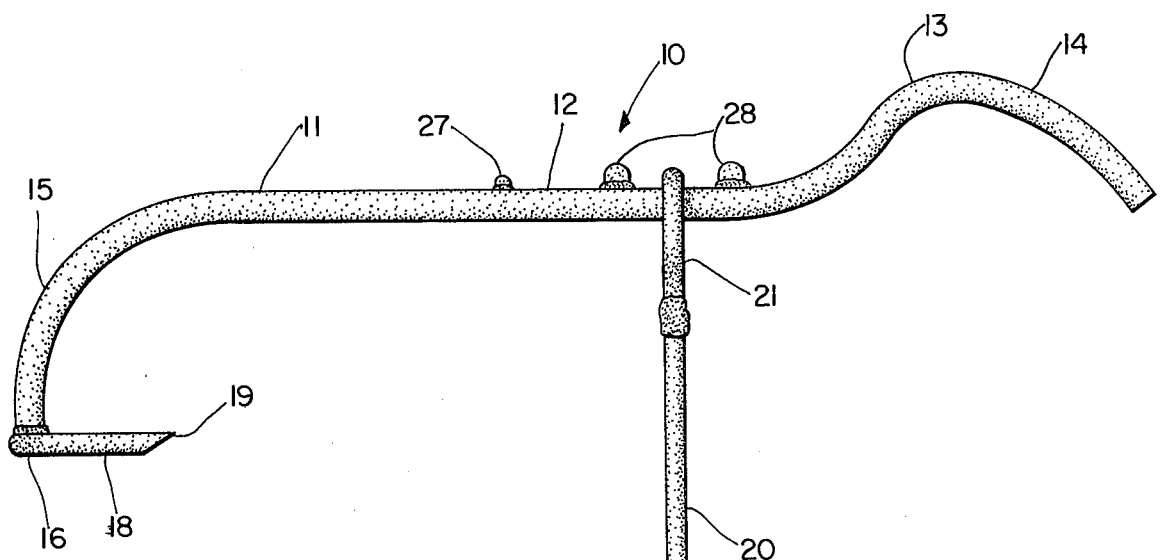
FIG. 1 is a side elevational view of the wood handling tool according to the present invention.

In FIG. 1, there is indicated generally at 10 a specific embodiment of the wood handling tool according to the present invention. The tool 10 comprises a rigid rod 11 of approximately ½ inch in diameter and of a cold rolled steel. The rod 11 has a substantially straight central portion 12 which is disposed substantially horizontally as shown in FIG. 1 when the tool is in a lifting position.

At one end of the rod there is an upwardly curved arcuate portion 13 the end of which defines a handle 14. At the other end of the rod there is a downwardly curved end portion 15 at the end of which is welded a V-shaped tooth element 16 having a pair of diverging legs 17 and 18, as can be best seen in FIG. 2, the ends of which are pointed at 19. The tooth or pointed member 16 may be formed of a single rod which is then welded to the end of the rod end portion 15.

A gripping member 20 is suspended from the central portion 12 of the rod 11 by means of a loop 21 which encircles the rigid rod 11. Diverging downwardly from the loop 21 is a pair of legs 22 and 23 the ends of which are curved upwardly at 24 and 25 in substantially a U shape and the ends of the upwardly curved portions are pointed at 26. The legs 22 and 23 may be formed of two separate pieces which are welded to the lower end of the loop 21.

Figure 5:
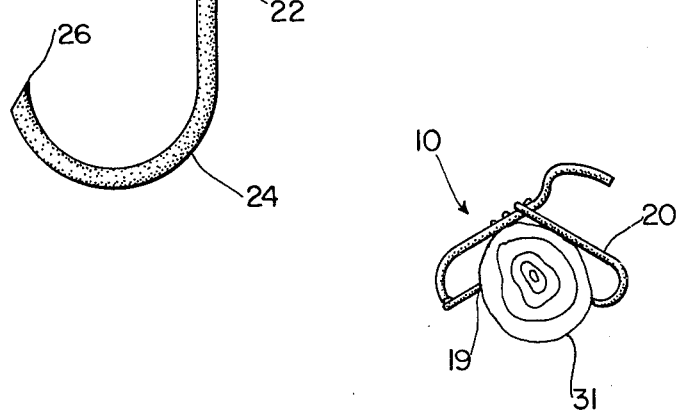
FIG. 5 is a side elevational view in reduced scale showing a wood log gripped by the handling tool of FIG. 1.

The points 19 and 26 are sufficiently sharp so as to be able to penetrate into a log or piece of wood in the manner as indicated in FIG. 5.

As can be seen in FIG. 1, the legs 22 and 23 of the gripping member 20 extend downwardly from the rod central portion 11 about twice the distance of the pointed element 16.

Figure 2:
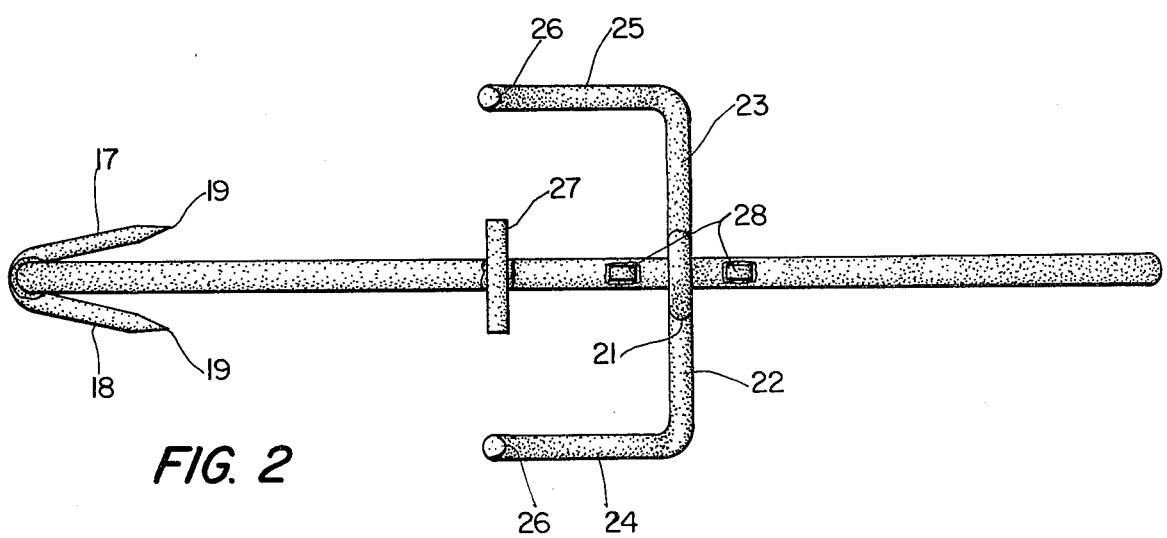
FIG. 2 is a top plan view of the tool shown in FIG. 1.
Figure 3:
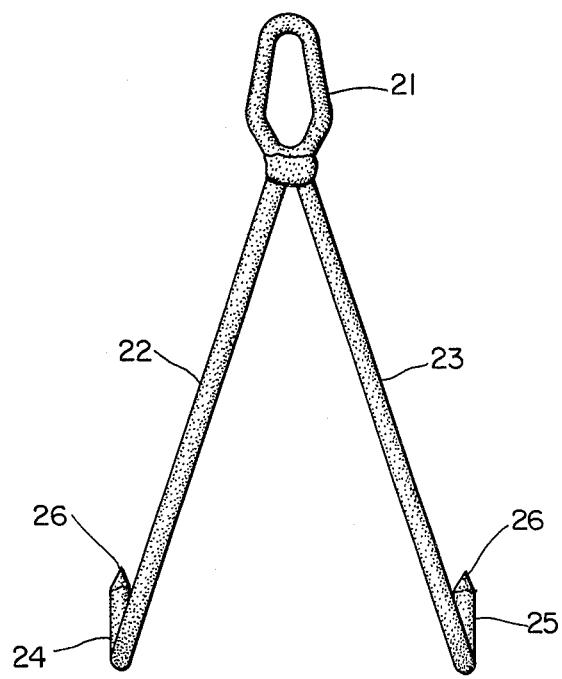
FIG. 3 is a side elevational view of the gripping member which is shown supporting from the rod in FIGS. 1 and 2.

In order to adjustably position the gripping member along the central portion 12 of the rigid rod 11, there is provided a short transverse bar element 27 which is about ¼ inch in diameter and is welded to the top of the rigid rod 11 as shown in FIGS. 1 and 2. A pair of circular projections 28 are also welded to the top of the rod 11 and are spaced from the bar 27 in a direction toward the handle 14 as may be seen in FIGS. 1 and 2. The projections 28 may be circular elements.

Figure 4:
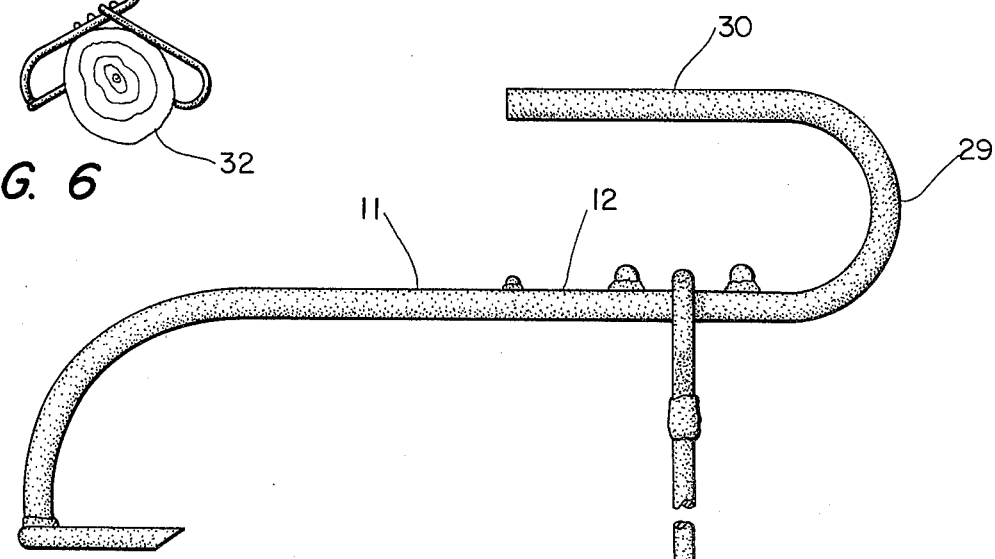
FIG. 4 is a view similar to that of FIG. 1 but showing a modification thereof.

In FIG. 4 there is illustrated a modification wherein the handle end of the rigid rod 11 is curved upwardly and back upon the rod at 29 to form a handle 30 which is spaced from and substantially parallel to the central portion 12 of the rod 11. The remaining structure of the modification of FIG. 4 is the same as described for the embodiment of FIG. 1.

In FIG. 5, the wood handling tool 10 of FIG. 1 is shown gripping a log 31. In order to grip a piece of wood in the tool 10 it is preferable to lower the handle 14 and engage the points 26 of the gripping member 20 into the wood and then to pivot the rod downwardly so that the points 19 on the rigid rod become engaged on the other side of the piece of wood.

The piece of wood is released by pivoting the handle to disengage the points 19 first and then remove the points of the gripping member.

Plastic or rubber grips may be placed on the handles 14 and 30, if so desired, to facilitate handling the tool.

Figure 6:
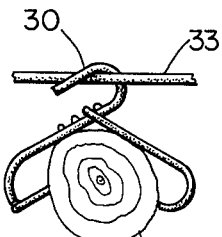
FIG. 6 is a view similar to that of FIG. 5 but showing the modification of FIG. 4 and further showing a supporting rod for use by two persons.

In FIG. 6 there is shown the modification of FIG. 4 gripping a log 32 and this modification functions in the same manner as the tool 10 shown in FIG. 5.

The modification of FIG. 4 is particularly adapted for use in carrying large pieces of wood which would be too heavy for one person to handle. In order to carry such a large piece of wood, a metal supporting bar or tube 33 about 42 inches may be positioned under the handle 30 and each end of the bar 33 is then gripped by a person. A 1½ inch loop may be welded at the midpoint of the bar 33 into which the handle 30 may be inserted. Thus, two people can use this wood handling tool to handle a larger piece of wood.

For ease in transportation of storage, the tool, according to the present invention, can be readily disassembled by removing the gripping member from the rigid rod. The loop 21 on the gripping member is sufficiently large so as to pass over the projections and the handle.

If it is desired that the gripping member not be disassembled from the tool a second transverse rod element similar to the element 27 can be welded to the top of the rigid bar between the projections 28 and the handle 14 or 30. The different components of the tool are all made from steel, such as forgeable steels.

Thus it can be seen that the present invention has disclosed a wood handling tool which is simple in construction and light in weight so that it can be readily handled by one person in lifting and carrying the piece of wood, such as a log for a fireplace or stove. The gripping and releasing of a piece of wood are accomplished merely by a tilting movement of the rigid rod so that no complicated release mechanism is required. For particular ease in operation, an individual might use two such handling tools at a time so that he can carry a piece of wood in each hand and thus balance the weights of the pieces of wood against each other.

It will be understood that this invention is susceptible to modification in order to adapt it to different usages and conditions, and, accordingly, it is desired to comprehend such modifications within this invention as may fall within the scope of the appended claims.

What is claimed is:

1. A device for handling a piece of wood and the like comprising a rigid rod having a substantially straight central portion and having a first end portion curving upwardly from one end of said central portion to define a handle, said rod having a second end portion curving downwardly from the other end of said central portion, pointed tooth means on the extreme end of said rod second end portion and directed toward the central portion of said rod, a gripping member having a loop at one end thereof loosely encircling said rod central portion to depend freely therefrom, said gripping member having a pair of legs diverging downwardly from said loop, a pointed tooth on the end of each of said legs directed substantially towards said pointed tooth means, said pointed teeth and tooth means being sufficiently sharp to penetrate into a piece of wood and thereby exert a gripping action on a piece of wood positioned between said tooth means and said gripping member when a lifting force is exerted on said handle, means on said rod central portion for positioning the loop of said gripping member thereon, said positioning means comprises a transverse rod element attached to the upper surface of said rod central portion and a plurality of projections spaced therefrom toward said handle.

2. A device as claimed in claim 1 wherein said gripping member legs extend downwardly a greater distance than said rod second end portion when said rod central portion is disposed in a horizontal position.

3. A device as claimed in claim 1 wherein said pointed tooth means comprises a pair of pointed teeth.

4. A device as claimed in claim 1 wherein said rod first end portion has an arcuate shape with the concave portion thereof directed downwardly.

5. A device as claimed in claim 1 wherein said rod first end portion is curved back upon said rod to define a handle parallel to and spaced from said rod central portion.

6. A device as claimed in claim 5 and further comprising a supporting bar passing under said handle and extending on both sides of said device whereby each end of the bar can be lifted by a person such that two persons can carry a greater load using said device.

7. A device as claimed in claim 1 wherein the ends of the legs of said gripping member each has a substantially U-shaped curve and said pointed teeth on the ends of said curved ends.

* * * * *